United States Patent [19]

Garner

[11] Patent Number: 4,519,614
[45] Date of Patent: May 28, 1985

[54] GENERALLY CYLINDRICAL ROTARY DRILL FACE SEAL HAVING IMPROVED RESISTANCE TO RADIAL DISTORTION

[75] Inventor: Lloyd L. Garner, Fort Worth, Tex.
[73] Assignee: Rock Bit Industries U.S.A., Inc., Fort Worth, Tex.
[21] Appl. No.: 598,229
[22] Filed: Apr. 9, 1984
[51] Int. Cl.³ .............................................. F16J 15/34
[52] U.S. Cl. ........................................ 277/84; 277/92; 277/95; 277/70; 277/177; 277/186; 277/166; 277/215; 384/94
[58] Field of Search ................. 277/12, 32, 70, 74–76, 277/92, 79, 83, 84, 95, 166, 173, 174, 177, 186, 215; 384/94

[56] References Cited

U.S. PATENT DOCUMENTS

| | | | |
|---|---|---|---|
| 3,137,508 | 6/1964 | Cunningham | 384/94 X |
| 3,365,247 | 1/1968 | Ferrand | 384/94 X |
| 3,389,760 | 6/1968 | Morris | 277/12 X |
| 3,397,928 | 8/1968 | Galle | 277/92 X |
| 3,458,207 | 7/1969 | Conti | 277/177 X |
| 3,467,448 | 9/1969 | Galle | 277/84 X |
| 3,765,495 | 10/1973 | Murdock et al. | 384/94 X |
| 3,944,306 | 3/1976 | Neilson | 277/95 X |
| 3,955,859 | 5/1976 | Stella et al. | 277/70 X |
| 4,256,351 | 3/1981 | Langford | 384/94 |
| 4,294,492 | 10/1981 | Evans | 384/94 |

*Primary Examiner*—Robert S. Ward
*Attorney, Agent, or Firm*—Hubbard, Thurman, Turner & Tucker

[57] ABSTRACT

An improved seal for utilization with earth boring drill bits which employ rolling cutters mounted on shafts extending from face surfaces on the drill bit body. The improved seal includes a generally cylindrical elastomeric seal which is disposed around each shaft with one end of the generally cylindrical elastomeric seal in sealing and sliding engagement with the face surface surrounding that shaft. The second end of the generally cylindrical elastomeric seal is engaged in sealing and sliding engagement with a surface on the rolling cutter. A rigid generally cylindrical ring is disposed within each generally cylindrical elastomeric seal preferably near the outer surface thereof and serves to minimize radial distortion of the generally cylindrical elastomeric seal in response to axial compression. In a preferred embodiment of the present invention, a plurality of axial grooves are provided in the inner surface of each generally cylindrical elastomeric seal to permit lubrication material to pass through the seal.

14 Claims, 4 Drawing Figures

GENERALLY CYLINDRICAL ROTARY DRILL FACE SEAL HAVING IMPROVED RESISTANCE TO RADIAL DISTORTION

BACKGROUND OF THE INVENTION

This invention relates in general to improved seals for drill bit bearings and in particular to seals which resist deformation and distortion in response to increased loading.

Earth boring drill bits, such as are typically employed in the petrochemical industry for drilling oil or gas wells, are rugged pieces of equipment which must operate in very severe environments. In such operations, a drill bit is typically threaded onto a section of pipe and lowered into a wellbore wherein it is rotated for the purpose of cutting through rock and earth formations. Rotatable cutters are usually mounted on a shaftlike cutter support and the fragments of rock created by the operation of the rolling cutters are removed from the wellbore utilizing a drilling fluid or "mud" solution. In prior art drill bits, several solutions have been proposed to inhibit the ingress of abrasive detritus into the bearings of the rolling cutter thereby permitting the rolling cutter to be operated over extended periods of time in this environment. One such solution to this problem has been the utilization of pressure equalized lubricant reservoirs which are operated by the pressures of the drilling fluid within the wellbore and serve to equalize the pressure of the lubricant being forced onto the bearing surfaces. This pressure equalized lubricant reservoir has been moderately successful in preventing the ingress of abrasive detritus into the bearing area; however, the pressure equalized lubricant reservoir does result in the egress of lubricant from the bearing area in greater amounts than is normally experienced.

Another approach to the problem of preventing abrasive material from wearing away at the bearing surface has been the utilization of various ring sealing devices. An early example of this approach may be seen in U.S. Pat. No. 3,397,928, issued to Edward M. Galle, which utilizes the simple expedient of an elastomeric sealing ring which has been compressed between the inner face of the rolling cutter and the cutter shaft. Another example of a packing ring seal utilized in rotary drill bits may be seen in U.S. Pat. No. 3,656,764, issued to William P. Robinson. The Robinson drill bit seal assembly utilizes two elastomeric O-ring seals which are separated by a rigid ring which is utilized to seat the O-rings into opposing bearing surfaces. This utilization of a rigid ring allegedly provides an increase in accommodation or radial, axial and angular displacements over previously known O-ring seals. A third example of sealing ring devices can be seen in U.S. Pat. No. 3,137,508, issued to R. A. Cunningham. The Cunningham seal comprises a frusto-conical metallic ring which is lightly encapsulated with a resilient lubricant resistant material at those areas which form seals with rotating metal surfaces.

Each of these sealing mechanisms and pressure equalized lubrication systems is designed to prevent the ingress of abrasive detritus into the bearings supporting the rolling cutters. This is necessary since it is most desirable to operate the drill bit for long periods of time between drill bit changes, due to the amount of manpower and time required to remove the drill stem from the wellbore to replace the drill bit. Complicating this problem is the fact that the fluctuations in position and pressure which are encountered by an earth boring drill bit during operation are substantial and tend to displace the rolling cutter from the shaft upon which it is mounted. One method of sealing the bearings supporting drill bit rolling cutters which accommodates such displacements is the so-called "face" seal which is disposed between a surface of the rolling cutter and a face surface of the drill bit body. Such seals generally experience a similar compression whether loaded or unloaded and provide an excellent seal. However, it is necessary to ensure that the axial compression exerted upon such a seal does not radially distort the seal to the point where the seal engages the shaft surface and the rotating inner surface of the rolling cutter, thereby subjecting the seal to radial and angular displacements which may have an untoward effect on the sealing capability of the device.

SUMMARY OF THE INVENTION

Therefore, it is one object of the present invention to provide an improved rotary seal for use in earth boring drilling bits.

It is another object of the present invention to provide an improved rotary face seal for use in earth boring drilling bits.

It is yet another object of the present invention to provide an improved rotary face seal for use in earth boring drilling bits which is resistant to radial distortion caused by axial compression.

It is another object of the present invention to provide an improved rotary face seal for use in earth boring drilling bits which provides increased effectiveness over known packing ring seals and drill bit bearings.

The foregoing objects are achieved as is now described. The improved seal includes a generally cylindrical elastomeric seal which is disposed around each shaft with one end of the generally cylindrical elastomeric seal in sealing and sliding engagement with the face surface surrounding that shaft. The second end of the generally cylindrical elastomeric seal is engaged in sealing and sliding engagement with a surface on the rolling cutter. A rigid cylindrical ring is disposed within each generally cylindrical elastomeric seal near the outer surface thereof and serves to minimize radial distortion of the generally cylindrical elastomeric seal in response to axial compression. In a preferred embodiment of the present invention, a plurality of axial grooves are provided in the inner surface of each generally cylindrical elastomeric seal to permit lubcation material to pass through the seal.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
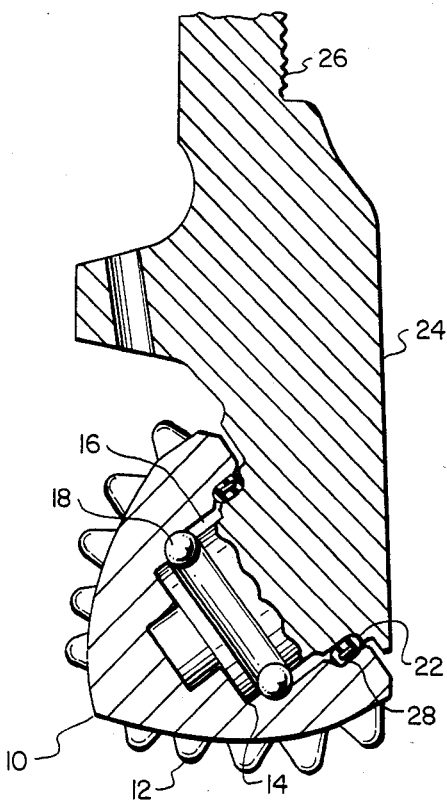
FIG. 1 is a longitudinal sectional view through a drill bit rolling cutter together with its associated bearing shaft and support which illustrates the improved generally cylindrical face seal of the present invention.

With reference now to the figures and in particular with reference to FIG. 1, there is depicted a longitudinal sectional view through a drill bit rolling cutter, together with its associated bearing shaft and support, which illustrates the improved generally cylindrical face seal of the present invention. Rolling cutter 10 is depicted as including a plurality of cutting inserts such as 12, which may be constructed of tungsten carbide or other material known in the art. As is typical in this art, rolling cutter 10 is mounted on a shaft 14 by means of friction bearings 16 and ball bearings 18. Shaft 14 is formed on a face surface 22 of cutter support 24. Cutter support 24 includes a threaded portion 26 which is utilized for connection to a drill stem (not shown) in a manner typical in this art. Not depicted in FIG. 1, but present in all such drill bit systems is a lubrication system, which may or may not be pressure equalized, which serves to lubricate the bearing surfaces upon which rolling cutter 10 is mounted. Such lubricant systems normally have a lubricant reservoir, a pressure equalizer or compensator and various conduits or passages for maintaining lubricant on the bearing surfaces of the bit. Since such systems are well known in the art, they are not illustrated in the figures here. It is the egress of this lubricant and the ingress of detritus and drilling fluid which must be inhibited to promote increased operation of such drill bits. To this end, generally cylindrical face seal 28 is disposed between the lubricated bearing surfaces and the abrasive particles in the environment of the wellbore.

Figure 2:
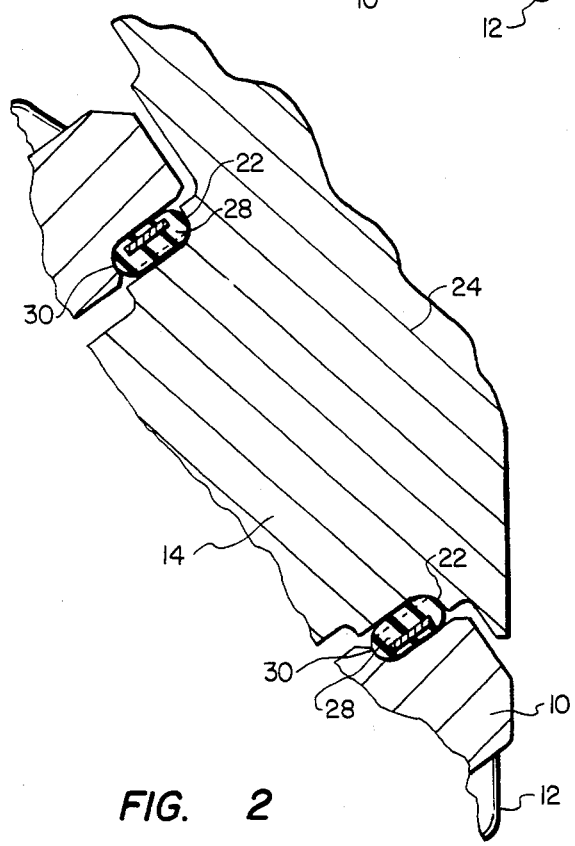
FIG. 2 is a large scale sectional view of the improved generally cylindrical face seal of the present invention.

Referring now to FIG. 2, there is depicted a larger scale drawing of seal 28 which is useful in disclosing the construction and operation of the novel generally cylindrical face seal of the present invention.

Known ring seals in the prior art fall generally into two categories. First, a so-called "shaft" seal which is disposed in the concave portion of the rolling cutter or on the surface of the support shaft and compressed therein. Shaft seals are compressed radially with respect to the shaft and provide reasonable accommodation to axial displacements of rolling cutter 10. However, known "O" ring shaft seals must have a considerable amount of compression to maintain an adequate seal especially on the "unloaded" side of the shaft when the drill bit is operated for prolonged periods of time with heavy loads applied to the bit.

The second category of ring seals is the so-called "face" seal wherein the seal ring is disposed on the face of the cutter support and is compressed between the face surface of the cutter support and the surface of the rolling cutter. Face seals are not subject to the unequal loading that shaft seals encounter due to differences in bearing clearances. In addition to eliminating the effects of bearing clearances, face seals require less squeeze than shaft seals which must be radially squeezed to operate.

As can be seen in FIG. 2, generally cylindrical seal 28 is disposed around shaft 14 with one end of the generally cylindrical seal in sealing and sliding engagement with face surface 22 of cutter support 24. The second end of generally cylindrical seal 28 is in sealing and sliding engagement with face surface 30 of rolling cutter 10 and, in a preferred embodiment of the present invention, generally cylindrical seal 28 is sized such that upon assembly of rolling cutter 10 onto shaft 14, generally cylindrical seal 28 is compressed axially with respect to shaft 14 a sufficient amount to form and maintain the proper seal under operating conditions. In a preferred embodiment it has been found that such compression can be less than ten percent of its relaxed length.

As can also be seen in FIG. 2, generally cylindrical seal 28 does not radially engage rolling cutter 10; however, a small amount of radial distortion of generally cylindrical seal 28 could cause generally cylindrical seal 28 to radially engage rolling cutter 10, and thus become a shaft seal. As a shaft seal, generally cylindrical seal 28 would be subject to the unequal loading that such seals generally encounter due to differences in bearing clearances as discussed above. Thus, it becomes necessary to design generally cylindrical seal 28 in a manner which will preclude radial distortion of generally cylindrical seal 28 in response to axial compression with respect to shaft 14.

Figure 3:
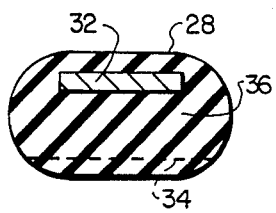
FIG. 3 is a greatly enlarged sectional view of the improved generally cylindrical face seal of the present invention.

Referring now to FIG. 3, there is shown a greatly enlarged sectional view of generally cylindrical seal 28 which depicts the components thereof. As can be seen, generally cylindrical seal 28 is constructed utilizing a generally cylindrical elastomeric ring 36 which may be constructed of any suitable elastomeric substance such as butadiene acrylonitrile (BUNA N) rubber or any other known lubricant resistant material having a durometer hardness from approximately seventy to ninety, although variations in hardness may be appropriate for alternate applications. Elastomeric ring 36 is shown in cross section in FIG. 3 to illustrate that the sides are generally parallel with the ends being rounded to form what is referred to throughout the specification and claims as a "generally cylindrical" continuous seal ring. Upon installation of the ring over the shaft of the drill bit and upon installation of the rolling cutter cone, the slightly rounded ends of the ring will be compressed to form the seal at the face of the shaft and at the face of the rolling cutter cone. Preferably the ends of elastomeric ring 36 will have the rounded shoulders to flatten out and form such seal upon axial compression of the seal member between the faces of the shaft and the cutter cone. Disposed within generally cylindrical elastomeric ring 36, near the outer surface thereof, is rigid continuous cylindrical ring 32 which is an important feature of the present invention. Rigid cylindrical ring 32 is constructed utilizing any hard and relatively non elastomer material such as a metallic substance, a ceramic material or a hard plastic material. Materials such as stainless steel rings are preferably inserted into cylindrical elastomeric ring 36 during construction thereof. Rigid cylindrical ring 32 serves to restrain radial deformation or distortion of generally cylindrical seal 28 in response to axial compression thereof to thereby prevent the cylindrical seal from engaging the inner surfaces of the cutter cone to prevent such seal from functioning as a shaft seal.

Those ordinarily skilled in the art, upon reference to this specification, will appreciate that rigid cylindrical ring 32 must be substantially thinner than generally cylindrical elastomeric ring 36, in order that the resilient sealing properties of generally cylindrical seal 28 not be severely diminished. In a preferred embodiment of the present invention, rigid cylindrical ring 32 is less than one-third the thickness of generally cylindrical elastomeric ring 36. The axial width of rigid cylindrical ring 32 should be sufficient to restrain substantial radial distortion of seal member 28 when the seal member is compressed between the faces of the shaft and the rolling cutter. Such axial width of course should not be so great as to interfere with such compression. Generally cylindrical elastomeric ring 36 is typically constructed utilizing molding techniques and rigid cylindrical ring 32 may be positioned within generally cylindrical elastomeric ring 36 utilizing a plurality of metal pins which can be broken off after construction.

As those skilled in the art will appreciate, the size of rigid cylindrical ring 32 may be varied to control the pressure at which cylindrical seal 28 relieves itself. Thus, as the length of rigid metallic generally cylindrical ring 32 becomes shorter than the length of cylindrical seal 28, its control over radial distortion of generally cylindrical seal 28 lessens and the pressure at which generally cylindrical seal 28 will relieve is decreased. Also depicted in FIG. 3 is an axial groove 34 which is useful for permitting lubricant material to pass from the bearing area of shaft 14 onto the shaft beneath generally cylindrical seal 28.

Figure 4:
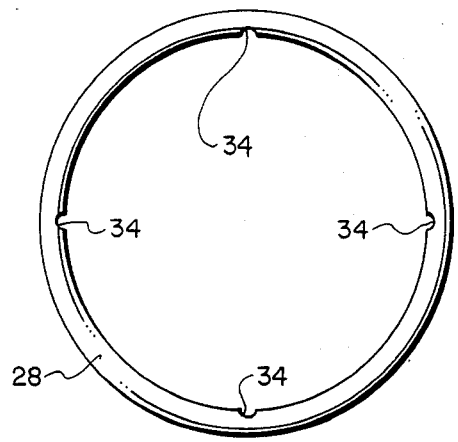
FIG. 4 is an end view of the improved generally cylindrical face seal of the present invention.

Referring now to FIG. 4, there is depicted an end view of generally cylindrical seal 28 which depicts a plurality of axial grooves 34 disposed about the inner surface of generally cylindrical seal 28, which are all utilized to permit lubricant material to pass from the bearing area of shaft 14 onto the shaft beneath cylindrical seal 28. In this manner, the shaft beneath generally cylindrical seal 28 receives a uniform amount of lubricant material and undue wear on generally cylindrical seal 28 is therefore avoided.

While the seal structures have been illustrated as having the continuous rigid and relatively non elastomeric ring 32 being positioned near the outer radial portion of seal member 28 to prevent radial distortion of the outer radial surface of the seal to prevent the seal from engaging the surfaces of cutter cone 10, it will be appreciated that such ring 32 may be positioned nearer the inner radial portion of seal member 28 to prevent radial distortion of the inner radial surfaces of the seal and to prevent the seal from engaging the radial surfaces of shaft 14.

Although the invention has been described with reference to a specific embodiment, this description is not meant to be construed in a limiting sense. For example, while the seal structures of this invention have been illustrated as being especially useful in drill bits, such seals can be used in other types of equipment wherein varous rotating shafts are sealed. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A rotary seal for utilization with an earth boring drill bit having a drill bit body with a shaft rigidly mounted on a face surface thereof and a rolling cutter having a face surface rotatably mounted on said shaft, said seal comprising:
   a generally cylindrical elastomeric seal having generally parallel sides and rounded ends and a longitudinal dimension which is greater than the thickness of said seal, said generally cylindrical elastomeric seal having a first rounded end in sealing and sliding engagement with said face surface of said drill bit body and a second rounded end in sealing and sliding engagement with said face surface of said rolling cutter; and
   a rigid cylindrical ring entirely disposed within said generally cylindrical elastomeric seal for minimizing radial distortion of said generally cylindrical elastomeric seal in response to axial compression thereof wherein said generally cylindrical elastomeric seal and said shaft will remain separated despite compression of said generally cylindrical elastomeric seal.

2. The rotary seal according to claim 1 wherein said generally cylindrical elastomeric seal is constructed of rubber.

3. The rotary seal according to claim 2 wherein said generally cylindrical elastomeric seal is constructed of rubber having a durometer hardness of between seventy and ninety.

4. The rotary seal according to claim 1 wherein said rigid cylindrical ring is constructed of stainless steel.

5. The rotary seal according to claim 1 wherein the thickness of said rigid cylindrical ring is less than one-third the thickness of said generally cylindrical elastomeric seal.

6. The rotary seal according to claim 1 wherein said generally cylindrical elastomeric seal is sized such that upon assembly of said rolling cutter onto said shaft said generally cylindrical elastomeric seal is axially compressed less than ten percent of its relaxed condition axial length.

7. The rotary seal according to claim 1 wherein said rigid cylindrical ring is disposed within said generally cylindrical elastomeric seal near the outer radial portion thereof.

8. A rotary seal for utilization with an earth boring drill bit having a drill bit body with a shaft rigidly mounted on a face surface thereof and a rolling cutter having a face surface rotatably mounted on said shaft, said seal comprising:
   a generally cylindrical elastomeric seal having generally parallel sides and rounded ends and a longitudinal dimension which is greater than the thickness of said seal, said generally cylindrical elastomer seal having a first rounded end in sealing and sliding engagement with said face surface of said drill bit body and a second rounded end in sealing and sliding engagement with said face surface of said rolling cutter;
   a rigid cylindrical ring entirely disposed within said generally cylindrical elastomeric seal for minimizing radial distortion of said generally cylindrical elastomeric seal in response to axial compression thereof wherein said generally cylindrical elastomeric seal and said shaft will remain separated despite compression of said generally cylindrical elastomeric seal; and
   a plurality of axial grooves disposed on the inner surface of said generally cylindrical elastomeric seal for receiving lubrication material.

9. The rotary seal according to claim 8 wherein said generally cylindrical elastomeric seal is constructed of rubber.

10. The rotary seal according to claim 9 wherein said generally cylindrical elastomeric seal is constructed of rubber having a durometer hardness of between seventy and ninety.

11. The rotary seal according to claim 8 wherein said rigid metallic cylindrical ring is constructed of stainless steel.

12. The rotary seal according to claim 8 wherein the thickness of said rigid metallic cylindrical ring is less than one third the thickness of said generally cylindrical elastomeric seal.

13. The rotary seal according to claim 8 wherein said generally cylindrical elastomeric seal is sized such that upon assembly of said rolling cutter onto said shaft said generally cylindrical elastomeric seal is axially compressed less than ten percent of its relaxed condition axial length.

14. The rotary seal according to claim 8 wherein said rigid cylindrical ring is disposed within said generally cylindrical elastomeric seal near the outer radial portion thereof.

* * * * *